Dec. 10, 1957     C. F. CARLSON     2,815,734
APPARATUS FOR DEVELOPING XEROGRAPHIC IMAGE
Filed Feb. 1, 1955     2 Sheets-Sheet 1

INVENTOR.
CHESTER F. CARLSON
BY
ATTORNEY

Dec. 10, 1957      C. F. CARLSON      2,815,734

APPARATUS FOR DEVELOPING XEROGRAPHIC IMAGE

Filed Feb. 1, 1955      2 Sheets-Sheet 2

INVENTOR.
CHESTER F. CARLSON
BY
Frank A. Steinhilper
ATTORNEY

United States Patent Office 2,815,734
Patented Dec. 10, 1957

2,815,734

APPARATUS FOR DEVELOPING XEROGRAPHIC IMAGE

Chester F. Carlson, Pittsford, N. Y., assignor to The Battelle Development Corporation, Columbus, Ohio, a corporation of Delaware Application February 1, 1955, Serial No. 485,408

7 Claims. (Cl. 118—630)

This invention relates to a method and apparatus for the development of electrostatic latent images.

In xerography it is usual to form an electrostatic latent image on a surface. One method of doing this is to charge a photoconductive, insulating surface and then dissipate the charge selectively by exposure to a pattern of activating radiation. Other means of forming electrostatic latent images are set forth in U. S. 2,647,464 to James P. Ebert. Whether formed by these means or any other, the resulting electrostatic charge pattern is conventionally utilized by the deposition of an electroscopic material thereon through electrostatic attraction whereby there is formed a visible image of electroscopic particles corresponding to the electrostatic latent image. Alternatively, the electrostatic charge pattern may be transferred to an insulating film and the electroscopic particles deposited thereon to form the visible image. In any case, this visible image, in turn, may be transferred to a second surface to form a xerographic print.

The process of depositing the electroscopic powder on the electrostatic image to render the electrostatic image visible is called the "development step" and is one of the most critical steps of the entire process. The step is of particular importance both on machines designed for continuous operation with any type of copy and in processing continuous-tone images. Now, in accordance with the present invention, a method and an apparatus are provided for substantially improved development of an electrostatic latent image. This process is distinguished by its unexcelled flexibility of operation combined with a high quality of tonal reproduction.

Fig. 1 of the attached drawings is a block diagram showing the position of the development step in an overall xerographic process which results in a visible image.

Figure 1:
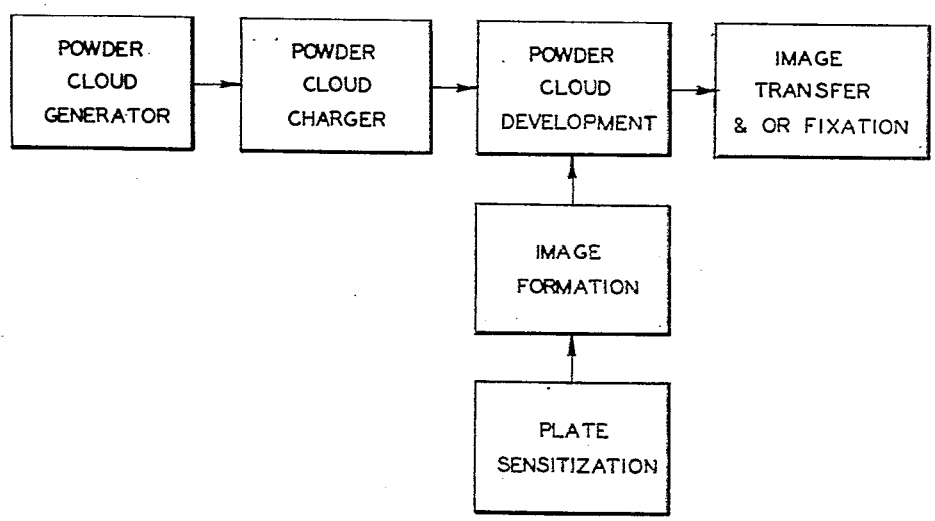

As shown in Fig. 1, the general xerographic process involves the formation of an electrostatic latent image. This is generally, although not always, preceded by a treatment to sensitize the surface on which the electrostatic latent image is to be formed. When the image is to be formed on a photoconductive insulating surface, the surface may be sensitized by placing thereon a uniform electrostatic charge as shown in U. S. 2,297,691. The electrostatic latent image to be useful must then be rendered visible, which is done in a development step. This is accomplished by depositing electroscopic particles either on the surface on which the image was formed or on an insulating surface to which the electrostatic latent image has been transferred.

It is evident that no picture can be better than its development step permits. About the coarsest type of image reproduced by a xerographic process requires a resolution of at least about 50 lines per inch. Commercial, line-copying machines generally have a resolution power of about 125 to 250 lines per inch. The process used in obtaining this resolution is set forth in U. S. 2,618,552 and involves the use of a finely-divided, colored material called a "toner" deposited on a slightly more coarsely divided material called a "carrier." This two-component developer is cascaded across the electrostatic latent image areas. The control of the concentration of toner in the two-component developer becomes extremely difficult in the continuous operation of such line copy machines. When applied to continuous-tone development where resolutions of about 1200 or more lines per inch are often desired, it has been found impossible to obtain this high quality of reproduction using such a system. Accordingly, a system is preferred in which an air or gas suspension of finely-divided colored or black material is brought near the electrostatic image in order to deposit the material on the image by so-called "powder cloud development." This is the system incorporated in Fig. 1.

As shown in Fig. 1, a powder cloud is generated as from a dry material or by forming a spray of liquid droplets to produce an air or gas suspension. The cloud so produced is then charged, the charging step constituting either a separate step, or utilizing the inherent charge on the cloud in the case of a cloud of dry particles. A cloud so generated and charged is then contacted with the electrostatic latent image in the development step. The visible image so produced may be used as such, permanently affixed to the plate, or may be transferred to another material as a sheet of paper or plastic, as is well-known to those skilled in the xerographic art.

The instant invention relates to a process and apparatus therefor which represents a substantial improvement in the art of powder cloud development. Many of the methods of powder cloud development used heretofore have been characterized by difficulties such as streaking, uneven development, poor adaptation for continuous machine use, and general lack of versatility in such variances of the basic development process as tone-controlled development. The process of the instant invention represents substantial improvement in all of these. In general, the present invention accomplishes these objectives by confining the development to a relatively narrow zone of the image-bearing member which, in turn, is moved relative to the development zone by moving either the image-bearing member or the development zone itself. By the term "development zone" as used herein is meant, of course, the area between the development electrode and the image-bearing surface. By the term "xerographic plate" is meant a photoconductive insulating material such as selenium, anthracene, zinc oxide in a suitable resin binder, etc. coated on a conductive backing as aluminum, brass, conductive paper, etc. The process of the invention and apparatus for its accomplishment will now be set forth in more detail.

According to the present invention, a cloud of electroscopic particles is generated in a cloud-forming device; for example, as by agitation of a powder mass in a closed container with a rotating brush or a rotating air mass as caused by laterally located nozzles, or by removing powder from a uniformly-loaded belt through an aspirator. If a cloud of liquid droplets is desired, it may be produced by any means known to those skilled in the art, as by spraying through an atomizer.

The cloud, by whatever means produced, is then charged, where a cloud of dry particles is used, any method of generating the cloud will almost necessarily produce a charge thereon. For some purposes, the charge so produced will be adequate. If it is desired to produce a more uniform charge, however, other devices, such as triboelectric charging (as by passing the electroscopic powder through a narrow tube of suitable material in turbulent flow), corona charging or other charging device, may be used. In the case of a cloud of liquid droplets, charging means such as induction charging, corona charging, and so forth may be used. The charged cloud is then optionally passed into a collecting or distribution zone and then into the development zone.

In the process of the instant invention, development occurs in a relatively narrow zone defined by a slot in a chamber extending across the line of relative motion of an electrostatic, image-bearing member, which may be either a plate or film, and which is positioned in movable relationship to the slot so that the entire image-bearing portions of the image-bearing member will pass over the slot a portion at a time. The slot is substantially smaller than the image measured in the direction of motion. A development electrode is positioned in the slot so as to define an entrance slot into the space between the development electrode and the image-bearing member, this space constituting the development zone, and is coextensive in length with the portions of the slot over which the image-bearing portions of the image-bearing member will pass. The image-bearing member is positioned at a distance of no more than about 1/8" from the development electrode in the slot and is moved relative to the slot while the air or gas suspension of electroscopic particles are blown to the development zone. The electroscopic particles are deposited on the image-bearing member thereby forming a visible, or developed, image corresponding faithfully to the electrostatic latent image. This visible powder image then is used by further steps of the xerographic process, as, for example, by transfer, fixing or other means, to yield a xerographic print or to yield other useful forms of the electrophotographic image.

If a denser image is desired, the image-bearing member may be passed across the development zone as often as desired. Also, more than one development zone may be used. This permits obtaining the effect of more than one development pass while requiring only a single movement of the image-bearing member. Furthermore, different biasing voltages may be placed on each development electrode thereby permitting a wide range of tone control over the electrostatic image while requiring only a single pass of the image-bearing member. Along with the use of different biasing voltages in each development zone, either the same or different charges may be placed on the electroscopic particles used in each development zone thereby giving further flexibility to the development process.

It is also desirable, although not necessary, to so position the development electrode in the slot as to define with the chamber both an entrance and an exit slot to the development zone. By this means, it is possible to confine development more closely to the development zone, and, in addition, prevent waste and loss of electroscopic particles otherwise escaping from the apparatus. In this connection, it is desirable to so position the development electrode that the top of the electrode is below the top surface of the chamber so that a substantial portion of the development zone is below the top surface of the chamber. It is understood, of course, that in any event the top of the developemnt electrode must be no more than about 1/8" from the image-bearing surface. The electroscopic particles collected at the exit slot may then desirably be recirculated either to the powder cloud generator or to the collecting zone on the entrance side of the apparatus, or otherwise in the apparatus.

Figure 2:
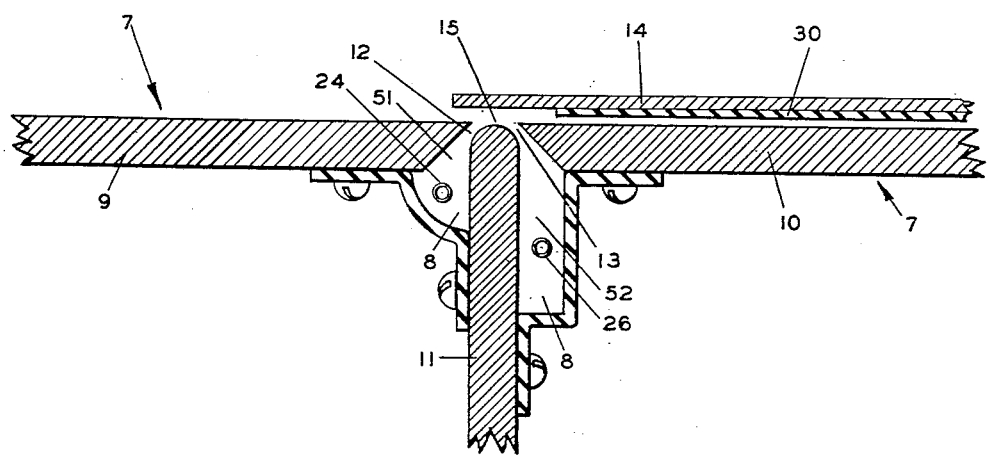
Fig. 2 is a diagrammatic side elevation in cross section of apparatus according to one embodiment of the invention.

The general nature of the process of the invention and the apparatus having been set forth, a specific embodiment of the invention will now be described in Fig. 2. The invention is not limited to this embodiment, which is presented merely for purposes of illustrating one means of working the instant invention. As shown in Fig. 2, the apparatus illustrated contemplates a base plate 7 containing a development slot 8 which divides the base plate into a left member 9 and a right member 10. Positioned in the slot is a development electrode 11 so positioned relative to the base plate as to define an entrance slot 12 and an exit slot 13 and dividing the development slot 8 into a left chamber (entrance chamber) 51 and a right chamber (exit chamber) 52. Tube or conduit 24 connects entrance chamber 51 to a supply of finely-divided powder particles and electrostatically charges the particles by triboelectric contact with the walls of tube 24, while tube or conduit 26 connects exit chamber 52 with exhaust means whereby unused powder particles may be removed from the development zone 15 without contaminating the surrounding areas as more fully described in connection with the embodiment shown in Fig. 3. An image-bearing member, consisting in this case of a photoconductive insulating layer 30 coated on a conductive backing 14, is positioned in movable relationship to the base plate at a distance of no more than about 1/8" from the development electrode so as to define a development zone 15 over the development electrode in the said development slot. Optionally, means may be provided whereby the image-bearing member, either plate or film, may be moved over the development zone, or, if desired, the means may be omitted and the plate moved by hand. The direction the powder cloud travels within the slot may be either with or against the direction of plate motion.

The unit shown in Fig. 2 was designed to be used with xerographic plates having overall dimensions of 5" x 7" and an image area of 4" x 5". The overall size of the base plate was 5½" x 14½". The development slot was about 5" long and 5/16" wide at the top surface of the base plate. The development electrode was 3/8" wide, extended along the entire length of the development slot, and was so positioned in the development slot in the base plate as to define entrance and exit slots to the development zone, each 1/16" wide. The top of the development electrode was positioned about 0.010" below the top surface of the base plate, and shims 25 (in Fig. 3) were provided on the sides of the base plate so that the image-bearing surface of the xerographic plate was maintained at a distance of about 0.005" above the base plate making the total height of the development zone about 0.015".

Figure 3:
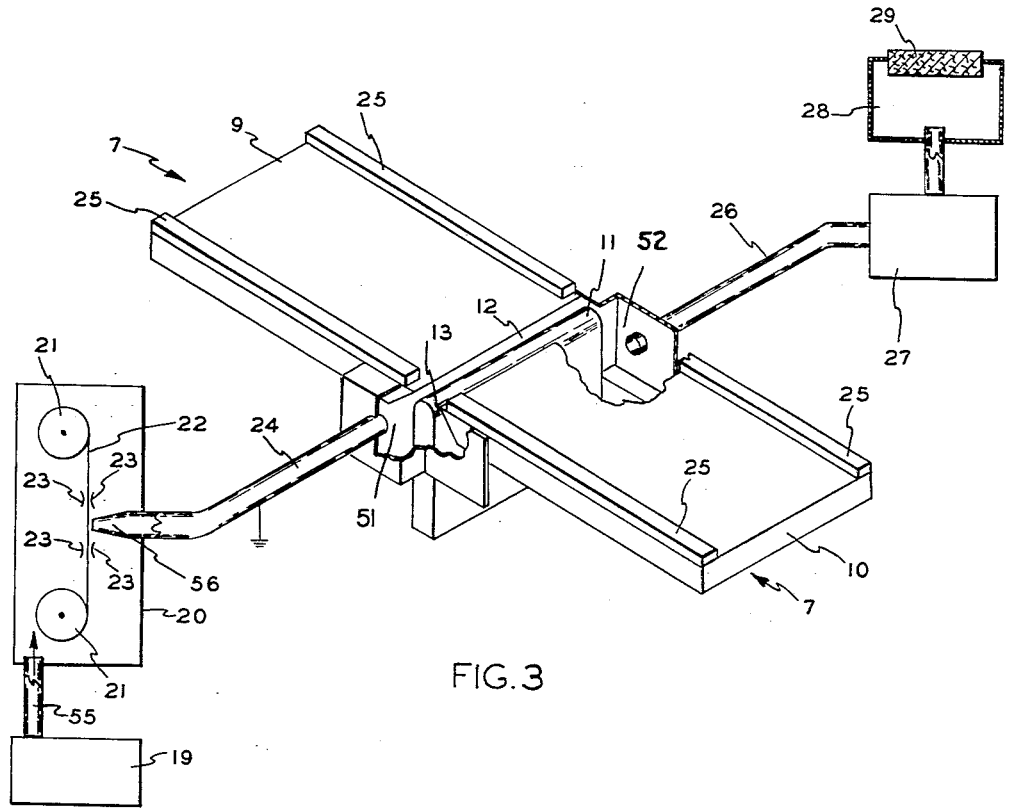
Fig. 3 is a semi-diagrammatic drawing of apparatus according to an embodiment of the invention.

Referring to Fig. 3, there is illustrated semi-diagrammatically a further embodiment of the invention somewhat similar to that shown in Fig. 2. According to this embodiment, an air or gas supply 19 is provided from which a tube or conduit 55 leads to an air-tight housing 20. Positioned within the housing are reels 21 carrying a powder impregnated ribbon 22. A suitable material for the ribbon would be, for instance, napped cotton flannel. The reels 21 are so mounted that the ribbon 22 passes over guides 23 which lead the ribbon past nozzle 56 of tube 24. In practice, the nozzle 56 and the ribbon 22 are relatively close together. The tube 24 leads from the nozzle to entrance chamber 51 of the development slot as shown in Fig. 2. The tube 24 is preferably constructed of a conductive metal, such as copper, or other metal and is grounded as shown. Positioned on the left member 9 and the right member 10 of the base plate 7 are shims 25. These shims position the image-bearing member at the correct distance from the development electrode 11. If the shims are made of insulating material, such as rubber, means should be provided for grounding the conductive backing of the xerographic plate. If the shims are of conducting material, such as a metal, and the basplate 7 is also of a conducting material, the left member 9 and the right member 10 of the base plate may each be grounded. In this case, the conductive backing of the xerographic plate is grounded by positioning on the shims 25 so that a separate ground for the conductive backing is not needed. Tube or conduit 26 leads from the exit chamber 52 (shown in Fig. 2) to a vacuum supplying means 27. This, in turn, is connected to a collecting box 28 which contains a filter 29 to remove powder particles from the air either for re-use or for easy disposal.

In operation, the air supply 19 maintains the air tight housing 20 at a greater than ambient pressure. The reels 21 are spring or motor driven to move the ribbon at a controlled rate past the nozzle 56. By this means a jet of gas is forced through the nozzle 56 bearing with it a supply of powder-in-gas suspension from the powder impregnated ribbon 22 into the tube 24. The tube 24 is a capillary, so that the powder particles in the gas suspension will be in turbulent flow and, through repeated contact with the walls of the nozzle 56 and tube 24, which are grounded, the powder particles will become charged. The xerographic plate as shown in Fig. 2, consisting of a photoconductive insulating layer 30 coated on a conductive backing 14 which plate has previously been charged and exposed to a pattern of light and shadow to create on the photoconductive insulating layer an electrostatic charge pattern corresponding to the pattern of light and shadow, is placed on shims 25 and moved, as by hand, over the slot while the powder cloud is being passed into the entrance chamber 51. The powder cloud, on entering the entrance chamber 51, travels the length of the chamber and passes over the electrode 11 within the development zone 15 as shown in Fig. 2 into the exit chamber 52. The vacuum means 27 may or may not be actuated, as desired. If vacuum is used to assist removal of the powder cloud from exit chamber 52, only a very slight amount should be used, such as a few pounds below ambient pressure. In any case, whether vacuum is used or not, the powder cloud exhaust passes through the tube or conduit 26 to the vacuum means 27 into the collecting box 28 where the filter 29 separates the powder particles from the air or gas.

Figure 4:
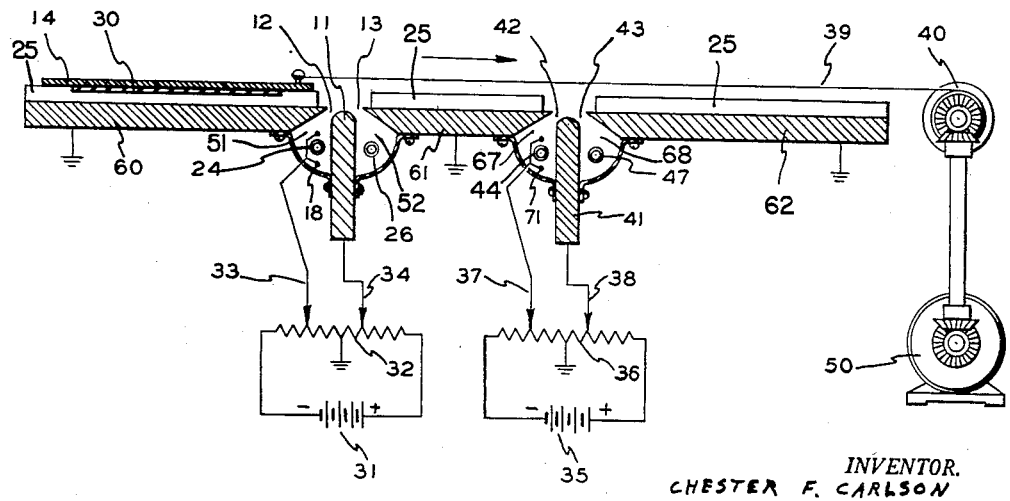
Fig. 4 is a semi-diagrammatic drawing of apparatus according to an embodiment of the invention.

In Fig. 4 there is shown another embodiment of the invention wherein multiple development zones are provided with separate biasing means therefore, together with means to mechanically move the image-bearing member over the development zones. In this case, the base plate consists of three members: the left member 60, a middle member 61, and a right member 62. Each member is constructed of conductive material, as metal, and is grounded. Dividing the base plate into the three sections are two development slots, the first corresponding in construction and number to Fig. 2 and having positioned therein a development electrode 11 dividing the slot into an entrance chamber 51 and an exit chamber 52.

The development electrode 11 is so positioned relative to the base plate 60 as to define an entrance slot 12 from the entrance chamber 51 to the development zone and is so positioned relative to the base plate 61 as to define an exit slot 13 from the development zone to the exit chamber 52. The entrance chamber 51 is connected by a tube or conduit 24 to a suitable powder cloud generator, such as shown in Fig. 3, while exit chamber 52 is similarly connected by a tube or conduit 26 to suitable exhaust means, such as shown in Fig. 3. The development electrode 11 is connected by means of tap 34 to a potentiometer 32 which in turn is connected with a suitable source of D. C. potential, as a battery 31. The tube or conduit 24 is constructed of a conductive material, such as metal, and is grounded. Positioned at the exit of the tube 24 are coronas 18 connected by means of tap 33 to the potentiometer 32.

The second development slot is similar in construction to the first and has positioned therein a development electrode 41 dividing the slot into an entrance chamber 67 and an exit chamber 68. The development electrode 41 is positioned relative to the base plate 61 to form entrance slot 42 from the entrance chamber 67 to the development zone and is positioned relative to the base plate 62 to form exit slot 43 from the development zone to the exit chamber 68. The entrance chamber 67 is connected to a powder cloud generator such as shown in Fig. 3 by tube or conduit 44 while exit chamber 68 is connected to suitable exit means as also shown in Fig. 3 by tube or conduit 47.

The tube or conduit 44 is constructed of a conductive material, as metal, and is grounded. Positioned adjacent to the exit of the tube 44 are coronas 71 which are connected by means of tap 37 to a potentiometer 36 which, in turn, is connected to a suitable source of D. C. potential, as a battery 35. The development electrode 41 is also connected by means of a tap 38 to the potentiometer 36.

Positioned on top of the base plates 60, 61 and 62 are shims 25 constructed of a conductive material, as metal, and of such dimensions as to position the photoconductive insulating surface 30 of the xerographic plate at the correct distance from the development electrodes 11 and 41. The base plates 60, 61 and 62 are constructed of a conductive material, such as metal, and are grounded, while the walls 72 of the two entrance and exit chambers are made of an insulating material. Alternatively, the shims 25 and the base plates 60, 61 and 62 may be constructed of an insulating material and a separate ground provided for the conductive backing 14 of the xerographic plate. Positioned on the shim 25 connected to the base plate 60 is a xerographic plate composed of a conductive backing material 14 having coated thereon a layer of a photoconductive insulating material 30. This plate is connected by suitable means 39, as a rope or wire, to take-up means 40, as a reel, which, in turn, is connected to a suitable drive means 50, as a motor.

In operation, assume that the photoconductive insulating layer 30 bears an electrostatic image having potentials varying from plus 20 volts to plus 300 volts. In developing such an image the powder cloud generator, such as shown in Fig. 3, is actuated to provide a powder cloud at tubes 24 and 44. At the same time the exhaust means, such as also shown in Fig. 3, are actuated. Taps 33 and 37 are adjusted to provide a corona charging current of, say, about 250 microamps. Taps 34 and 38 are then adjusted to obtain the desired tone and contrast in the finished print. By way of illustration, tap 34 may be adjusted to, say, plus 200 volts and tap 38 to plus 30 volts. The conductive backing 14 is grounded through contact with the shims 25 which are conductive and grounded through contact with the base plates 60, 61 and 62, all of which are conductive and grounded. The potentials between the development electrodes 11 and 41 and the conductive backing 14 will modify the effective electrostatic field drawn outward toward the development electrodes. This is termed "biasing."

Motor means 50 are then actuated drawing the image-bearing surface 30 over the successive development zones. As the image passes over the first development zone only those areas bearing a greater charge than plus 200 volts will be developed and these areas only to the extent of a maximum potential difference of 100 volts. As the plate passes over the second development zone all areas bearing a potential greater than about 30 volts will be developed. Thus, those areas having potentials between 30 and 200 volts will be developed for the first time over the second development zone while those areas having potentials greater than 200 volts will be developed a second time in the second development zone. In addition to this, those areas having a potential of about 20 volts will not be developed. As a result of this development, those areas having the lowest potential, that is 20 volts, and which therefore should be light in the resulting print, will be even lighter than if no bias had been used, while those image areas having charges greater than about 200 volts, and which therefore should be the darkest part of the resulting print, will be made even darker by having been developed twice. The flexibility of operation afforded by apparatus such as illustrated is readily apparent. Thus, where greater control over contrast or tone is desired additional development zones may be used with a single pass of the image-bearing member or, alternatively, an apparatus according to the invention having only one or two development zones may be used with multiple passes of the xerographic plate while each time changing the bias on the electrode. In addition, the charge on the powder cloud may also be varied by means of taps 33 and 37 to obtain further control over the contrast and tone of the resulting developed image.

The distance between the development electrode and the image-bearing surface can be no more than about 1/8" to effectively draw the field of force of an electrostatic image externally from the image-bearing surface and thus is particularly critical. For good photographic quality, the distance between the development electrode and the image-bearing surface should be no more than about 1/40". The development slot may extend across the length or the breadth of the image-bearing surface and may be anywhere from 0.020" or less wide up to about one-fourth the size of the image-bearing surface as measured parallel to the direction of relative motion of the image-bearing surface. In general, the slot is rather narrow and preferably will be from about 0.025" to about 2" wide, depending on the size of the image being developed.

By reason of combined ease in positioning the image-bearing surface in movable relationship to the development zone and economy in preventing loss of powder when the development electrode defines both entrance and exit slots to the development zone, it is preferred that a substantial portion, but less than all, of the development zone be below the top surface of the base plate. While this is a preferred embodiment, where other considerations are of overriding importance, the development electrode may be so positioned that the development zone is entirely above or entirely below the top surface of the base plate.

The speed of motion of the image-bearing surface relative to the development zone may vary widely so that development may require anywhere from one to ten or more seconds depending upon the image density desired, the number of development zones in the apparatus, the number of passes over the development zone or zones, etc. In continuous machines other steps of the xerographic process as sensitizing the photoconductive insulating surface, exposure, transfer, etc. may set the speed of the device.

In operation, the charged cloud particles are blown to the development zone through the entrance slot. While the cloud of charged particles is passing through the development zone, the image-bearing member is moved over the development zone so that only a portion of the image is over the development zone at any one time. The image-bearing member and base plate may be in the shape of flat members, as shown, or, if desired, may be curved to fit on a drum for continuous operation. The image-bearing member may be passed over the development zone once or as often as is desired by the operator. Alternately, additional development zones may be provided in the base plate, thereby obtaining the effect of multiple passes over the development zone while requiring only a single movement of the image-bearing member. An electrical potential is desirably maintained on the development electrode to permit improved image development. The development apparatus may be positioned within a container of suitable design so as to prevent loss of developer to external areas or merely to improve the appearance of the apparatus. Where the image-bearing member has a light-sensitive surface, it is desirable that the apparatus be positioned in a light-tight container. As set forth above, the visible image so produced may be used in any way known to those skilled in the art either by being permanently affixed to the surface of the image-bearing member or by being transferred to another surface, as a sheet of paper, plastic or other material, to which it may, if desired, be permanently affixed.

It is at once apparent that the instant invention offers unexcelled flexibility of operation. Thus, on a continuous machine of the rotating drum type, where a photoconductive insulating layer is coated on a drum and the various steps of the xerographic process as shown in Fig. 1 are carried out at various points positioned around the drum, it is evident that the overall speed of the entire process from sensitizing to fixing can be no faster than the speed of the slowest individual step. By varying the number of development zones around such a drum, it is possible to obtain a large degree of control over the speed of the development step. For example, to obtain adequate image density, it may be necessary to move the image past the development at a relatively slow rate—say about 5 seconds for a 4"x5" image-bearing surface. By putting in two development zones, the image in effect is developed as much as if it had passed over a single development zone twice. Thus, the speed of the drum may be increased with the two development zones so that development takes less time—say about 3 seconds.

It is possible to vary the image density as desired by varying the speed of movement of the image-bearing surface over the development zone, the number of passes over the development zone, or the number of development zones. It is also possible to vary the tone and/or contrast by varying the charge on the development electrode and/or the charge on the powder particles as by using one charge on the development electrode and another on the powder particles for one pass over the development zone and then varying either or both charges for a second pass over the development zone. The same effect may be obtained in one pass by using more than one development zone. It is also possible to use different charges on the development electrode and/or the powder particles for different portions of one image. These few examples illustrate the high degree of control the present invention gives over such variables as image density, speed of development, tone, and contrast.

I claim:

1. Apparatus for developing an electrostatic latent image comprising a cloud generator for generating a suspension of finely-divided material in gas, means for charging the cloud particles, a chamber having at least one slot therein, support means to receive and support in movable relationship to the said slot an electrostatic image-bearing member adjacent to the said slot and closely spaced therefrom, said slot extending across the line of relative motion of said image-bearing member and positioned to permit the image-bearing portions of the said image-bearing member to pass over said slot, said slot being substantially smaller than the said image-bearing portions measured in the direction of relative motion, a conductive electrode positioned in said slot and extending along the entire length thereof no more than 1/8-inch from said image-bearing member to define a development zone relative to said image-bearing member and means to feed the charged cloud particles into said development zone.

2. Apparatus for developing an electrostatic latent image comprising a cloud generator for generating a gas suspension of finely-divided material, means for charging cloud particles, a base plate, support means to receive and support in movable, parallel, face-to-face relationship to the said base plate an electrostatic image-bearing member adjacent to the said base plate and closely spaced therefrom, at least one slot in the said base plate across the line of relative motion of said image-bearing member and positioned to permit the image-bearing portions of the said image-bearing member to pass over said slot, said slot being substantially smaller than the said image-bearing portions measured in the direction of relative motion, a conductive electrode positioned in said slot and extending along the entire length thereof no more than 1/8-inch from said image-bearing member to define a development zone relative to said image-bearing member, and means to feed the charged cloud particles into said development zone.

3. Apparatus for developing an electrostatic latent image comprising a cloud generator for generating a gas suspension of finely-divided material, means for charging cloud particles, a base plate, support means to receive and support in movable relationship to the said base plate an electrostatic image-bearing member adjacent to the said base plate and closely spaced therefrom, at least one slot in the said base plate across the line of relative motion of the said image-bearing member and positioned to permit the image-bearing portions of the said image-bearing member to pass over said slot, said slot being substantially smaller than the said image-bearing portions measured in the direction of relative motion, a conductive electrode positioned in said slot and extending along the entire length thereof to define a development zone relative to said image-bearing member, said development zone being no more than about ⅛" high, and means to feed the charged cloud particles into said development zone.

4. Apparatus for developing an electrostatic latent image comprising a cloud generator for generating a gas suspension of finely-divided material, means for charging cloud particles, a base plate, support means to receive and support in movable relationship to the said base plate an electrostatic image-bearing member adjacent to the said base plate and closely spaced therefrom, at least one slot in the said base plate across the line of relative motion of the said image-bearing member and positioned to permit the image-bearing portions of the said image-bearing member to pass over said slot, said slot being substantially smaller than the said image-bearing portions measured in the direction of relative motion, a conductive electrode positioned in said slot and extending along the entire length thereof no more than ⅛-inch from said image-bearing member to define a development zone relative to said image-bearing member, said electrode being positioned relative to said base plate to define both entrance and exit slots to said development zone, and means to feed the charged cloud particles into said development zone.

5. Apparatus for developming an electrostatic latent image comprising a cloud generator for generating a gas suspension of finely-divided material, means for charging cloud particles, a base plate, support means to receive and support in movable relationship to the said base plate an electrostatic image-bearing member adjacent to the said base plate and closely spaced therefrom, at least one slot in the said base plate across the line of relative motion of the said image-bearing member and positioned to permit the image-bearing portions of the said image-bearing member to pass over said slot, said slot being substantially smaller than the said image-bearing portions measured in the direction of relative motion, a conductive electrode positioned in said slot and extending along the entire length thereof no more than ⅛-inch from said image-bearing member to define a development zone relative to said image-bearing member, said electrode being positioned relative to said base plate to define both entrance and exit slots to said development zone and so that a substantial portion of said development zone is below the top surface of the said base plate, and means to feed the charged cloud particles into said development zone.

6. Apparatus for developing an electrostatic latent image comprising a cloud generator for generating a gas suspension of finely-divided material, means for charging cloud particles, a base plate, support means to receive and support in movable relationship to the said base plate an electrostatic image-bearing member adjacent to the said base plate and closely spaced therefrom, more than one slot in the said base plate across the line of relative motion of the said image-bearing member and positioned to permit the image-bearing portions of the said image-bearing member to pass over said slots, each of said slots being substantially smaller than the said image-bearing portions measured in the direction of relative motion, a conductive electrode positioned in each of said slots and extending along the entire length thereof no more than ⅛-inch from said image-bearing member to define more than one development zone relative to said image-bearing member, and means to feed the charged cloud particles into each of said development zones.

7. Apparatus according to claim 6, including means to separately charge the powder fed to each development zone.

References Cited in the file of this patent

UNITED STATES PATENTS

| | | |
|---|---|---|
| Re. 22,419 | Smyser | Jan. 11, 1944 |
| 2,691,345 | Huebner | Oct. 12, 1954 |
| 2,716,826 | Huebner | Sept. 6, 1955 |